Feb. 9, 1960 P. E. YOST 2,924,408
MECHANICAL BALLOON LOAD RELEASING DEVICE
Filed Nov. 29, 1956 2 Sheets-Sheet 1

INVENTOR.
PAUL E. YOST
BY *William C. Babcock*
*Robert S. Horne*
ATTORNEYS

Feb. 9, 1960 P. E. YOST 2,924,408
MECHANICAL BALLOON LOAD RELEASING DEVICE
Filed Nov. 29, 1956 2 Sheets-Sheet 2

INVENTOR.
PAUL E. YOST
BY *William C. Babcock*
*Robert E. Howe*
ATTORNEYS

United States Patent Office 2,924,408
Patented Feb. 9, 1960

2,924,408

MECHANICAL BALLOON LOAD RELEASING DEVICE

Paul E. Yost, Sioux Falls, S. Dak., assignor to General Mills, Inc., a corporation of Delaware Application November 29, 1956, Serial No. 625,073

8 Claims. (Cl. 244—137)

The present invention relates to a mechanism for supporting an article from a balloon in flight and dropping the article after a predetermined time or at a predetermined altitude.

In sending an article aloft with a balloon flight, it may be customary to provide an automatic releasing mechanism to detach the article from the balloon after a predetermined time. The article is usually attached to a parachute and returns to earth upon release from the balloon.

Heretofore, it has been customary in some cases to release the article from the balloon by providing a timed release mechanism. However, control in regard to the balloon and the article during flight may be required. For example an unexpected flight condition could conceivably cause the balloon to ascend or descend beyond a prescribed course of flight. In such a case if the article were a recording instrument the information obtained would be of little or no significance. Furthermore, such an unforeseen change could in some cases prevent recovery of the article due to variation in the flight pattern of the balloon.

Another problem sometimes encountered in a time activated release mechanism is that of premature release of the article from the balloon during handling and launching operations.

It is, therefore, an object of the present invention to provide an improved mechanical balloon load releasing device.

Another object of the invention is a balloon load release mechanism that assures positive release of the load should the balloon vary too far in altitude from its prescribed course of flight.

A further object of the invention is to provide a mechanical balloon load releasing device having means to prevent premature release of the load from the balloon prior to reaching a prescribed altitude.

Other objects and advantages will become more apparent from the following specification in connection with the drawings, in which.

Figure 3:
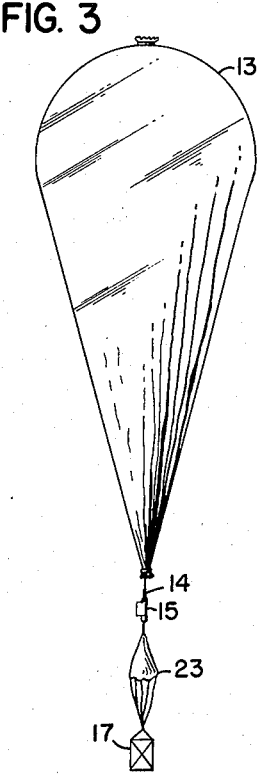
Fig. 3 is a view of a balloon in flight just after its release from the ground.

As illustrated in Fig. 3, the apparatus embodying the preferred embodiments of the present invention is supported from a balloon 13. The balloon 13 may be of any type sufficiently large enough to support the apparatus 15 and load 17. Balloons of this type are usually constructed of a lightweight thermoplastic material such as polyethylene and are filled with a lifting gas. The balloons are designed to ascend to a designated altitude where the winds are favorable to carry it over a prescribed course and after a time release the load from the balloon.

The apparatus shown generally at 15 consists of a container 10 (Fig. 1) which may be substantially square in shape and which serves as a housing for the combined elements that make up the apparatus 15, and is of material sufficiently strong enough to support the combined elements and the load attached to the container.

Figure 7:
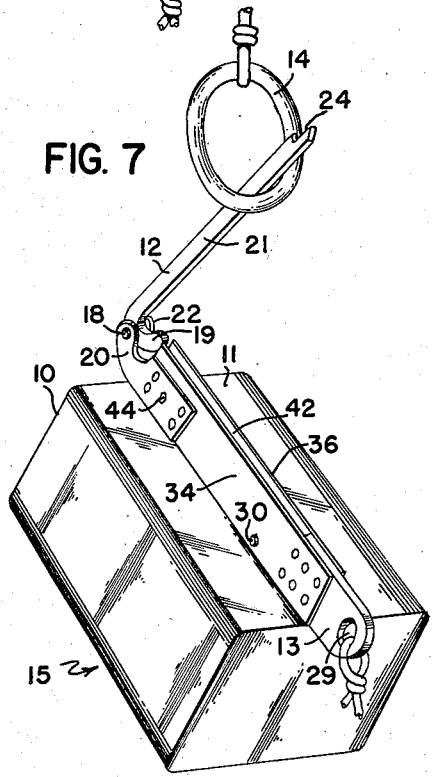
Fig. 7 is an isometric view showing the release mechanism freeing itself from the end fitting of the balloon.

Located along the side 11 of the container 10, as best viewed in Fig. 7, are flange portions 34 and 36. These flange portions 34 and 36 are formed as a part of the container 10 and are located in the center of the side 11 and extend along the entire length of the load supporting member 10 and protrude outwardly 90° therefrom. A narrow opening 42 between the flanges 34 and 36 is provided to accommodate an attaching means herein shown and described as a latching member in the form of a pelican hook 12 which acts as a connecting link to attach and release the container 10 and its load from the balloon load ring 14.

The pelican hook 12 is pivotally mounted at its upper end between support brackets 20 and 22 by a laterally extending pin 18. The support brackets 20 and 22 are mounted to the opposing sides and at the upper end of flanges 34 and 36 such as by rivets 44.

The pelican hook 12 has at its upper end a curved surface or hook 19 immediately below the support pin 18 and facing inwardly toward the container 10 hereinafter referred to as the load supporting member 10. Extending outwardly from the hook 19 the arm 21 of the pelican hook 12 is substantially straight and of a length equal to approximately ⅔ the length of the load supporting member 10. The pelican hook 12 also has at its lower end a notched area 24 cut away from the outer face of the arm 21. The notched area 24 engages a roller 26 to lock the hook 19 in a closed position when it is attached to load ring 14 of the balloon 13.

Figure 1:
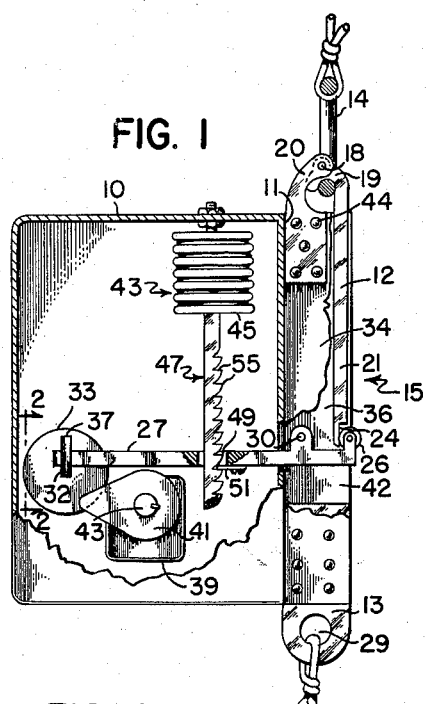
Figure 1 is a side elevational view of the release mechanism with a portion of the container broken away to show the integral parts of the unit.

Referring now to Fig. 1, the load supporting member 10 is supported beneath the balloon 13 by a load ring 14 engaged by the hook portion 19 of the pelican hook 12. The lower end 21 of the pelican hook 12 is swung downward and held in a vertical position by a roller 26 attached to an actuating means, herein shown and described as a second latching member in the form of a trigger arm 27 extending 90° to the pelican arm 12.

Figure 2:
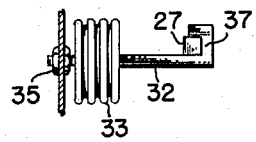
Fig. 2 is a view taken along line 2—2 of Fig. 1 showing the locking device for the actuating arm.

The trigger arm 27 is pivotally mounted nearest the roller 26 by a pin 30 extending laterally through the trigger arm 27 and the flanges 34 and 36 of the load support member 10. The opposite end of the trigger arm 27 is locked in position by a locking arm 32 normal to said trigger arm 27. The purpose of the locking arm 32 is to prevent accidental or premature release of the container 10 and the load attached thereto before a predetermined time or before reaching the desired altitude. The locking arm 32, as best viewed in Fig. 2 is associated with a commercial type pressure sensitive actuating bellows 33 mounted to the side of the container 10 by a nut and screw arrangement 35 and extends outward in a horizontal direction toward the trigger arm 27.

The locking arm 32 is mounted on the face of the bellows 33 and engages the trigger arm 27 and retains the arm 27 in a locked position. For engaging the trigger arm 27 the locking arm 32 is provided with a U-shaped tip 37. The locking arm 32 extends beneath the actuating arm 27 and the U-shaped tip 37 engages the actuating arm 27 when the bellows is in a retracted position. The actuating arm 27 is thus held in position until a change in pressure caused by the ascent of the balloon 13 causes the bellows 33 to expand and move the locking arm 32 outward freeing the actuating arm 27 from the U-shaped tip 37. The bellows 33 and the locking arm 32 may be adjusted by the nut and screw arrangement 35 to free the actuating arm 27 at any prescribed pressure change or altitude at the discretion of the personnel connected with the flight.

Once the balloon 13 has reached a predetermined altitude sufficient to release the locking arm 32, the actuating arm 27 may be actuated to release the unit in one of two ways. When a course of flight has been predicted and timing has been established, a commercial timer 39 mounted to a side wall of the load supporting member 10 is set to actuate a cam 41 by the rotation of a shaft 43. The timer 39 is not herein described but may be of any known commercial type. Many spring wound time clocks have a rotary shaft such as 43 which are suitably for mounting the cam 41. As the timer continues to rotate the shaft 43, the cam 41 which is positioned beneath the actuating arm 27 will engage the bottom surface of the trigger arm 27 forcing it upward on the end nearest the cam 41 and causing the opposing end to pivot around the pin 30 to swing the roller 26 out of the path of the pelican hook 12, thereby allowing the lower end to swing upward as shown in Figs. 6 and 7 to permit the pelican hook 12 to slide through the balloon load ring 14 and release the load support member 10 from the balloon.

According to another feature of the invention, an additional release assembly 43 is provided to assure positive altitude control release means for the balloon.

Figure 5:
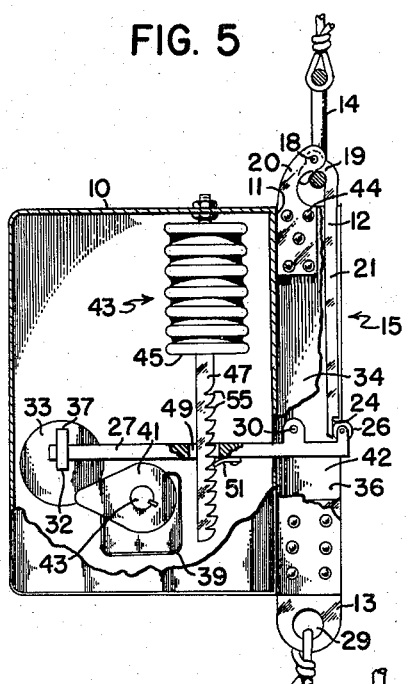
Fig. 5 is a side elevational view of the release mechanism during a period when the balloon is rising in flight.

Extending downwardly from top portion 11 of the load supporting member 10, directly above the trigger arm 27 is the altitude control release assembly 43 which consists of a pressure sensitive bellows 45, and an engaging member 47 provided with a ratchet surface and herein described as a saw blade. The saw blade 47 is mounted in the center of the lower surface of the bellows 45. The saw blade 47 extends downwardly through an opening 49 in the actuating arm 27 and engages a strip of spring metal 51 which is mounted beneath the opening 49 on the actuating arm 27. The teeth 55 of the saw blade 47 are turned so that a curved surface faces downward and a horizontal surface is provided on the upper edge of each of the teeth to engage the spring metal 51 beneath the opening 49 of the actuating arm 27. Referring now to Fig. 5, as the balloon rises the bellows 45 expand causing the teeth 55 of the saw blade 47 to be forced downward through the opening 49 of the actuating arm 27. Since the curved surface of the teeth 55 face downward the spring metal 51 rides over that surface.

Figure 6:
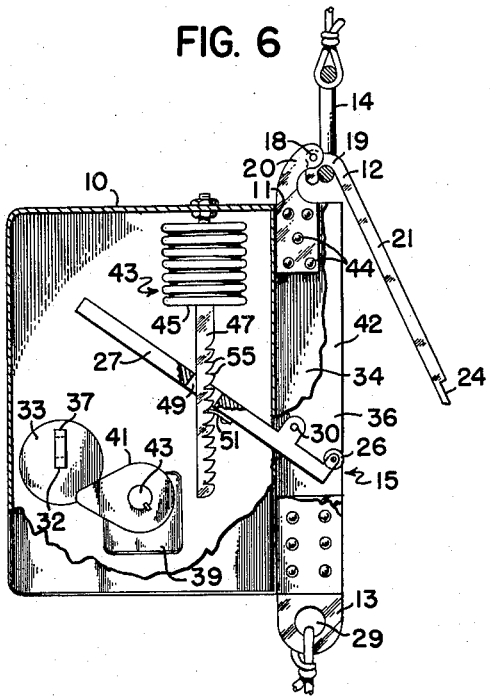
Fig. 6 is a side elevational view showing the release mechanism freeing the attaching arm from the balloon load ring.

If, however, the balloon should drop, then as shown in Fig. 6 the bellows 45 once more will contract. The upper edge of the teeth 55 will engage the spring metal 51 and lift the trigger arm 27 upward causing it to pivot around the pin 30. Roller 26 will thus release the pelican hook 12 at its lower end and release the load supporting member 10 from the balloon.

Referring now to the general operation of the unit, the load 17 is attached to the lower end of a parachute 23. The upper end of the parachute 23 is attached to an opening 29 of a support plate 13. The support plate 13 is mounted between the flanges 34 and 36 and extends downwardly beneath the load supporting member 10.

The release mechanism 15 is supported beneath the balloon 13 by the load support ring 14 and the pelican hook 12. The release mechanism 15, the parachute 23, and the load 17 are carried aloft to a predetermined altitude by the balloon 13.

As the balloon 13 rises, expansion of the bellows 33 causes the locking arm 32 to become disengaged from the actuating arm 27. Should the balloon rise to the predetermined altitude the release mechanism 15 will continue on its flight until the time period as set by the timer 39 is expended. The timer 39 will then rotate the cam 43 against the actuating arm 27 to detach the release mechanism 15 from the balloon.

If, however, the balloon 13 should lose altitude below its prescribed course of flight the altitude control assembly 43 will lift the actuating arm and detach the release mechanism 15 from the balloon. The maximum altitude to which the balloon 13 will rise will depend on the design factors and the amount of lifting gas.

When the release mechanism 15 is detached from the balloon 13, the pelican hook 12 pivots about the pin 18 in its upper end and due to the weight of the load 17, slides free of the balloon supporting ring 14.

Figure 4:
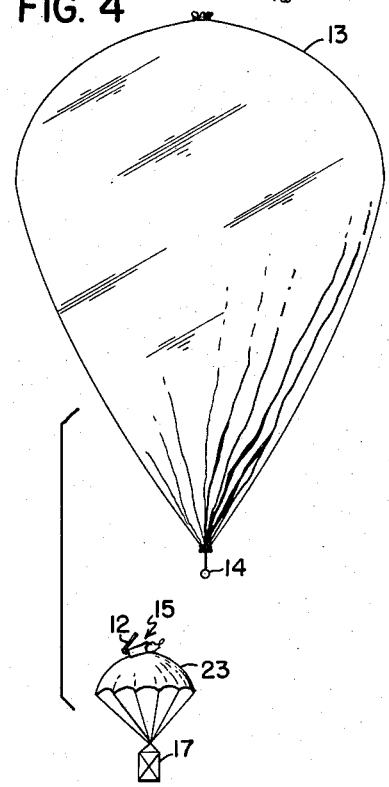
Fig. 4 is a view of a fully inflated balloon after it has reached its destination and released its load.

As the release mechanism 15 is dropped free of the balloon 13 the parachute 23 will open to support the load 17 as it returns earthward. The release mechanism 15 which has been released from the balloon 13 is still attached at its lower end to the top of the parachute 23 and will be supported by the billowing of the chute and ride earthward in the position shown in Fig. 4.

I have in the enclosed drawings and specification presented a detailed disclosure of the preferred embodiment of my invention. It is to be understood that the invention is susceptible to modifications and changes and it is not intended to limit the scope of the invention to the specific form disclosed, but to cover all modifications and changes falling within the scope of the principles taught by my invention and the claims appended hereto.

Now, therefore, I claim:

1. In a mechanism for supporting and releasing an article from a balloon, the combination comprising; a load supporting means, an attaching means on said load supporting means for connecting said supporting means to a load ring, an actuating means moveably mounted on said load supporting means releasably engaging said attaching means, a first means engaging said actuating means, said first means releasable from said actuating means after said balloon reaches a prescribed altitude, said actuating means remaining engaged with said attaching means after disengagement from said first means, a second means adapted to engage and release said actuating means from said attaching means subsequent to the release of said actuating means by said first means upon descent of said balloon subsequent to the balloon reaching said prescribed altitude, a third means engageable with said actuating means after a predetermined time to release said actuating means from said attaching means subsequent to the release of said first means from said actuating means, whereby said load supporting means is released from said load ring.

2. The combination of claim 1 wherein said attaching means includes a substantially straight arm having a hooked end, said hooked end pivotally mounted adjacent the upper end of said load supporting means, said hook facing inwardly toward said load supporting means, said arm extending downwardly through said ring, said hook engaging said ring and whereby said actuating means releasably engages said arm below said ring.

3. A mechanism in accordance with claim 1 wherein said actuating means includes; a horizontally extending trigger member pivotally mounted on said load supporting means, and engageable with said attaching means at one end of said trigger member whereby release of said trigger member from said attaching means detaches said load supporting means from said load ring.

4. A mechanism in accordance with claim 1, wherein said first engaging means includes; an adjustable retractable expansible pressure sensitive element, an engaging member coacting with said pressure sensitive element, said engaging member engaging said actuating means, said engaging member releasing said actuating means upon pressure actuation of said adjustable retractable expansible element.

5. A mechanism as described in claim 1, wherein said second engaging means includes; an adjustable pressure actuated expansible-contractible element, an engaging member coacting with said expansible-contractible element, said engaging member engaging said actuating means, said second engaging means providing unidirectional movement to said actuating means upon pressure actuation of said expansible-contractible element.

6. A mechanism as described in claim 1, wherein said third means includes; a timing means provided with an engaging member, said timing means moving said engaging member into contact with said actuating means at a predetermined time, whereby said engaging member moves said actuating means thereby releasing said attaching means.

7. A mechanism as described in claim 5 wherein said engaging member includes a ratchet surface in engagement with said actuating means.

8. A balloon load release mechanism attached to the load ring of a balloon including in combination, a trigger arm means pivotally mounted on said mechanism, elongate hook means pivotally mounted on said mechanism and releasably engageable at one end with said load ring and releasably engageable with said trigger arm means at the other end, a first actuating means engaging said trigger arm means after a predetermined time to pivot said trigger arm means to disengage said arm means from said elongate hook means, a second actuating means engaging said trigger arm means to pivot said trigger arm means to disengage said arm means from said elongate hook means, whereby actuation of the second actuating means occurs only upon descent of said balloon prior to actuation of the first said actuating means.

References Cited in the file of this patent

UNITED STATES PATENTS

| | | |
|---|---|---|
| 2,534,866 | Hakomaki | Dec. 19, 1950 |
| 2,710,218 | Frazier et al. | June 7, 1955 |
| 2,793,824 | D'ooge | May 28, 1957 |